United States Patent [19]

Miyake et al.

[11] Patent Number: 5,037,696

[45] Date of Patent: Aug. 6, 1991

[54] SUBSTRATE FOR HEAT-SENSITIVE RECORDING MATERIAL

[75] Inventors: Junichi Miyake, Tokushima; Masami Kanemoto, Osaka; Hironari Fujioka, Osaka; Hiroo Hayashi, Osaka, all of Japan

[73] Assignee: Kanzaki Paper Mfg. Co., Ltd., Tokyo, Japan

[21] Appl. No.: 269,286

[22] Filed: Nov. 10, 1988

[30] Foreign Application Priority Data

Nov. 13, 1987 [JP] Japan ................................ 62-287689

[51] Int. Cl.[5] ........................ B32B 23/08; B41M 5/18

[52] U.S. Cl. .................................... 428/336; 428/340; 428/475.8; 428/476.1; 428/480; 428/512; 428/513; 428/514; 428/521; 428/522; 428/910; 427/35; 427/152; 503/214

[58] Field of Search ............... 428/336, 521, 522, 480, 428/512, 513, 514, 340

[56] References Cited

U.S. PATENT DOCUMENTS

| | | | |
|---|---|---|---|
| 4,400,439 | 8/1983 | Kashiwagi | 428/480 |
| 4,668,573 | 5/1987 | Terao et al. | 428/521 |
| 4,681,796 | 7/1987 | Maehashi et al. | 428/521 |
| 4,727,055 | 2/1988 | Aoyagi et al. | 503/214 |

FOREIGN PATENT DOCUMENTS

| | | | |
|---|---|---|---|
| 659652 | 3/1963 | Canada | 428/512 |
| 0092592 | 11/1983 | European Pat. Off. | 428/512 |
| 0222888 | 5/1985 | Fed. Rep. of Germany | 428/512 |
| 0072146 | 4/1983 | Japan | 428/512 |

*Primary Examiner*—P. C. Sluby

*Attorney, Agent, or Firm*—Finnegan, Henderson, Farabow, Garrett and Dunner

[57] ABSTRACT

A substrate for heat-sensitive recording material is disclosed, comprising a film-like substrate made mainly of a synthetic resin and a sheet-like substrate made mainly of a fibrous materials laminated each other with an electron beam-curable adhesive. A heat-sensitive recording material using the above substrate provides an image having excellent quality.

4 Claims, No Drawings

SUBSTRATE FOR HEAT-SENSITIVE RECORDING MATERIAL

FIELD OF THE INVENTION

The present invention relates to a substrate for a heat-sensitive recording material and more particularly to a substrate which provides a heat-sensitive recording material having excellent recorded image quality.

BACKGROUND OF THE INVENTION

As substrates for heat-sensitive recording materials, various sheet-like substrates such as paper and film-like substrates such as synthetic resin films are known. In general, sheet-like substrates such as paper have disadvantages in recording density and image quality although they are inexpensive. On the other hand, film-like substrates such as synthetic resin films provide recorded images of high density but, as compared with paper and the like having the same thickness, are poor in heat resistance and stiffness (so-called "nerve"). Therefore, the latter have disadvantages in that areas colored with high density at the time of heat recording are warped and readily deformed, and particularly in the case of thin films, troubles such as buckling and jamming with a heat-sensitive recording apparatus arise because they are limp. For this reason, it may be considered to use thick films. In this case, however, the problem arises in that the cost is excessively high. Accordingly, a laminate of an inexpensive paper having high stiffness with a thin film is usually used.

In bonding together the paper and the film, in general, an aqueous or solvent type adhesive is used. In any of the cases, in order to remove off water or the solvent after bonding, heating is needed. Since, however, synthetic paper and films are poor in heat resistance, heating is accompanied with heat shrinkage, deformation, strain and further problems such as curling and the like. For this reason, it has been proposed to use a reactive adhesive. In this case, however, problems arise in that long term aging is needed in the roll state in order to cure the adhesive, and further the pot life of the adhesive is short.

In the case where a thin film having a thickness of about 10 to 60 μm is bonded together with a substrate such as paper, if the paper is not made sufficiently smooth, irregularities of the paper exert great influences on the film surface and, as a result, a heat-sensitive recording material using such paper as a substrate cannot provide a recorded image of high quality.

SUMMARY OF THE INVENTION

The present invention is intended to overcome the above problems. It has been found that if a film-like substrate which is made mainly of a synthetic resin and which has high smoothness and readily provides a high recording density and a sheet-like substrate made mainly of a fibrous material which is inexpensive and has relatively high heat resistance and stiffness are bonded together with a specified adhesive, there can be obtained a substrate which exhibits greatly excellent performance as a substrate for a heat-sensitive material and provides a heat-sensitive material which produces a recorded image having high quality and is excellent in heat-sensitive apparatus suitability.

The present invention provides a substrate for a heat-sensitive recording material, comprising a film-like substrate made mainly of a synthetic resin and a sheet-like substrate made mainly of a fibrous material laminated each other with an electron beam-curable adhesive.

DETAILED DESCRIPTION OF THE INVENTION

Film-like substrates made mainly of synthetic resins which are used in the present invention include non-stretched or stretched films of polypropylene, polyethylene terephthalate, polystyrene, polyvinyl chloride, or polyethylene and; synthetic papers comprising the above film and a porous layer formed thereon, which are produced by coating the film with a coating solution prepared by adding an inorganic or organic pigment, a plasticizer, a surfactant and the like, if necessary, to polyvinyl chloride, polyvinyl acetate, polyester, polystyrene, polypropylene, polyethylene, an acrylic resin or an acetate resin, or other various organic copolymers, and quickly coagulating with water and then drying; and synthetic papers which are produced by adding an inorganic pigment (e.g., calcium carbonate and kaolin), a stabilizer, a dispersing agent and the like to a synthetic resin (e.g., polypropylene), kneading the resulting mixture in an extruder and extruding from a die slit in a film form, or if necessary, further forming thereon a porous layer prepared by successively stretching in the longitudinal or crosswise direction while heating to around the softening point of the resin. In the case that the thus produced synthetic paper is used as a support, not only a feeling like an ordinary paper is obtainable but also the coating solution for heat-sensitive layer is uniformly coated because of fine irregularities of the porous layer and, hence, the quality of a heat-sensitive recorded image is improved.

The film-like substrate made mainly of a synthetic resin is preferably as thin as possible from the viewpoint of production cost. On the other hand, from the viewpoint of image density and heat resistance, it is preferred for the film-like substrate to have a moderate thickness. Thus the thickness of the film-like substrate is usually 10 to 200 μm and preferably 20 to 100 μm. If the thickness is less than 10 μm, the desired effects cannot be obtained. On the other hand, if it is more than 200 μm, the production cost is increased excessively and the advantages of the present invention cannot be exhibited.

The sheet-like substrate made mainly of a fibrous material includes various papers made mainly of pulp fibers, e.g., wood free paper, coated paper, and cast coated paper; synthetic papers produced by forming a synthetic fiber, e.g., nylon, acrylic polymer, polyester, polyethylene, and rayon, into a pulp-like fiber and making paper therefrom; and papers made using a mixture of a natural fiber (wood pulp fiber) and a synthetic fiber.

The substrate for heat-sensitive recording material of the present invention is fabricated by bonding together a film-like substrate made mainly of a synthetic resin and a sheet-like substrate made mainly of a fibrous material as described above by the use of an electron beam-curable adhesive. As the electron beam-curable adhesive, prepolymers and monomers as described below which are cured upon application of electron beams can be used.

Prepolymers (a) Poly(meth)acrylate of 2 to 6-valent aliphatic, alicyclic or araliphatic alcohol and polyalkylene glycol;

(b) Polyvalent alcohol poly(meth)acrylate resulting from addition of alkylene oxide to 2 to 6-valent aliphatic, alicyclic, araliphatic or aromatic alcohol;

(c) Poly(meth)acryloyloxyalkylphosphoric acid ester;

(d) Polyester poly(meth)acrylate;

(e) Epoxy poly(meth)acrylate;

(f) Polyurethane poly(meth)acrylate;

(g) Polyamide poly(meth)acrylate;

(h) Polysiloxane poly(meth)acrylate;

(i) Low-molecular weight vinyl or diene-based polymer having a (meth)acryloyloxy group in the side chain and/or the end thereof; and (j) Modified product of any of the above-described oligoester (meth)acrylates (a) to (i).

Monomers (a) Carboxyl group-containing monomer exemplified by ethylenically unsaturated mono- or polycarboxylic acid and the like, and carboxylic acid salt-containing monomer such as the alkali metal salt, ammonium salt or amine salt of the above carboxyl group-containing monomer;

(b) Amido group-containing monomer exemplified by ethylenically unsaturated (meth)acrylamide or alkyl-substituted (meth)acrylamide, and vinyllactam such as N-vinylpyrrolidone;

(c) Sulfonic acid group-containing monomer exemplified by aliphatic or aromatic vinylsulfonic acid, and sulfonic acid salt group-containing monomer, such as the alkali metal salt, ammonium salt or amine salt of the sulfonic acid group-containing monomer;

(d) Hydroxyl group-containing monomer exemplified by ethylenically unsaturated ether and the like;

(e) Amino group-containing monomer such as dimethylaminoethyl (meth)acrylate-2-vinylpyridine;

(f) Quaternary ammonium salt group-containing monomer;

(g) Ethylenically unsaturated carboxylic acid alkyl ester;

(h) Nitrile group-containing monomer such as (meth-)acrylonitrile;

(i) Styrene;

(j) Ethylenically unsaturated alcohol ester such as vinyl acetate and (meth)allyl acetate;

(k) Mono(meth)acrylate of alkylene oxide addition polymer of compound containing active hydrogen;

(l) Ester group-containing bifunctional monomer exemplified by diester of polybasic acid and unsaturated alcohol;

(m) Bifunctional monomer comprising (meth)acrylic acid diester of alkylene oxide addition polymer of compound containing active hydrogen;

(n) Bisacrylamide such as N,N-methylenebisacrylamide;

(o) Bifunctional monomers such as divinylbenzene, divinylethylene glycol, divinylsulfone, divinyl ether, and divinyl ketone;

(p) Ester group-containing polyfunctional monomer exemplified by polyester of polycarboxylic acid and unsaturated alcohol;

(q) Polyfunctional monomer comprising polyester of alkylene oxide addition polymer of compound containing active hydrogen and (meth)acrylic acid; and (r) Polyfunctional unsaturated monomer such as trivinylbenzene.

These prepolymers and monomers can be used in combination. If necessary, they may be diluted with water or a solvent, and further can be used in the form of oil-in-water type emulsion. In this case, however, a drying step is needed and thus the prepolymers and/or monomers are preferably used by themselves.

To the adhesive can be added, if necessary, electron beam-incurable resins and other various auxiliary additives such as a dye, a pigment, a plasticizer, a lubricant, and a defoaming agent within the range that does not deteriorate the desired effects. Examples of such electron beam-incurable resins are an acrylic resin, a silicone resin, an alkyd resin, a fluoroplastic, and a butyral resin.

The above resin component is well mixed by the use of a suitable stirring machine, e.g., a mixer, and coated on at least one of the film-like substrate and the sheet-like substrate. A method of coating the adhesive is not critical; the adhesive is coated by the usual coating means such as a bar coater, a roll coater, an air knife coater, and a gravure coater. The amount of the adhesive coated (as dry weight) is preferably 0.1 to 20 $g/m^2$ and more preferably 2 to 10 $g/m^2$. If the amount is less than 0.1 $g/m^2$, no sufficient adhesion can be obtained. On the other hand, even if it is more than 20 $g/m^2$, no additional adhesion effect can be obtained, and such excessive addition is not desirable from the economic standpoint.

The viscosity of the adhesive at the time of coating varies with the type of a coating machine and the coating temperature. If the viscosity is too low, the adhesive excessively penetrates in the substrate. On the other hand, if the viscosity is too high, it becomes difficult to coat. Thus the viscosity of the adhesive is controlled within the range of preferably 100 to 20,000 cps (25° C.) and more preferably 1,000 to 8,000 cps (25° C.).

After coating of the electron beam-curable adhesive, the film-like substrate and the sheet-like substrate are bonded together by the use of e.g., a laminator, and then the adhesive is cured by irradiating with 0.1 to 15 Mrads, preferably 0.5 to 10 Mrads of electron beams by the use of an electron irradiation apparatus. If the dose of electron beams is less than 0.1 Mrad, the resin component is not sufficiently cured. On the other hand, if it is more than 15 Mrads, there is a danger of the film or substrate being degraded. Irradiation with electron beams can be performed in any suitable manner such as the scanning method, the curtain beam method, and the broad beam method. A suitable acceleration voltage employed in the irradiation with electron beams is from 100 to 300 KV.

On the substrate for heat-sensitive recording material of the present invention as obtained above, a heat-sensitive coating solution is coated, and it is finished as a heat-sensitive recording material. In order to obtain a high-quality recorded image, smoothing treatment such as super calendering may be applied.

The exact reason why excellent image quality and image smoothness are obtained by the use of the electron beam-curable adhesive is not always clear, but it is considered that since the curing and adhesion reaction of the adhesive is completed almost instantly by irradiation of electron beams without accompanying with the abrupt addition of heat energy, even if a substrate having poor heat resistance, such as a film, is used, heat shrinkage and deformation do not occur and high smoothness is maintained. Furthermore, since the film is bonded to the sheet-like substrate having good heat resistance, deformation, strain and shrinkage due to the heat of a thermal head and the like at the time of recording are efficiently inhibited, and a recorded image having excellent image quality can be obtained.

The present invention is described in greater detail with reference to the following examples. All parts and percents (%) are by weight unless otherwise indicated.

EXAMPLE 1

(1) Production of Substrate

A substrate for heat-sensitive recording material was produced by coating an acrylic electron beam-curable adhesive ("82XE195" produced by Mobil Oil Corp.) having a viscosity of 7,000 cps (25° C.) on a 35 μm-thick biaxially stretched porous polypropylene film ("Toyopearl ® SS" produced by Toyobo Co., Ltd.) in a dry amount of 5 $g/m^2$, placing the film on a wood free paper with a basis weight of 101 $g/m^2$, laminating them by passing through nip rolls under a linear pressure of 2 kg/cm, and then irradiating with 3 Mrads of electron beams by the use of an electron curtain type electron beam irradiation apparatus ("Electrocurtain CB150" produced by ESI Corp.) to cure the adhesive. This substrate for heat-sensitive recording material was measured for thickness, Bekk smoothness, surface roughness and stiffness.

The thickness was measured according to JIS P-8118, and the Bekk smoothness was measured according to JIS P-8119. The surface roughness was measured by the use of a three dimensional roughness measuring apparatus (Model TDF-3A manufactured by Kosaka Kenkyujo Co., Ltd.), and the mean value of ten measurements (Rx) was indicated. The stiffness was measured in both the machine direction (MD) and the crosswise direction (CD) of the substrate according to JIS P-8143.

(2) Preparation of Solution A

| | |
|---|---|
| 3-(N-Cyclohexyl-N-methylamino)-6-methyl-7-phenylaminofluorane | 10 parts |
| 5% Aqueous solution of methyl cellulose | 5 parts |
| Water | 30 parts |

The above composition was ground to a mean particle diameter of 3 μm by the use of a sand mill.

(3) Preparation of Solution B

| | |
|---|---|
| Benzyl 4-hydroxybenzoate | 20 parts |
| 5% Aqueous solution of methyl cellulose | 5 parts |
| Water | 55 parts |

The above composition was ground to a mean particle diameter of 3 μm by the use of a sand mill.

(4) Formation of Recording Layer 45 parts of the solution A, 80 parts of the solution B, 50 parts of a 20% aqueous solution of oxidized starch, and 10 parts of water were mixed and thoroughly stirred to prepare a coating solution. This coating solution was coated on the film surface of the substrate for heat-sensitive recording material as obtained in (1) in a dry weight of 5 $g/m^2$ and dried to obtain a heat-sensitive recording material.

(5) Formation of Overcoat Layer

A coating solution for overcoat layer, having the composition shown below was coated on the recording layer of the heat-sensitive material as obtained in (4) in a dry weight of 3 $g/m^2$ and dried.

| | |
|---|---|
| 8% Aqueous solution of polyvinyl alcohol ("PVA-117" produced by Kuraray Co., Ltd.) | 1,000 parts |
| Calcium carbonate ("Softon ® 1800" produced by Bihoku Funka Co., Ltd.) | 100 parts |
| Water | 100 parts |

The heat-sensitive recording material as obtained above was subjected to smoothing treatment by the use of a super calender (60 kg/cm) to produce a heat-sensitive recording material having an overcoat layer. This heat-sensitive recording material was placed on Sony ® Video Printer UP103, and printed and colored. The image quality obtained was visually evaluated.

The rating of evaluation was as follows:

○: The image quality is excellent.
Δ: The image quality is somewhat bad.
X: The image quality is bad.

The image smoothness after printing and coloration was visually evaluated.

The rating of evaluation was as follows:

○: The smoothness is good.
X: The surface is highly irregular.

The results are shown in Table 1.

EXAMPLE 2

A heat-sensitive recording material was produced in the same manner as in Example 1, except that as the electron beam-curable adhesive to be used in the lamination, an adhesive having a viscosity of 6,000 cps (25° C.) ("GRANDIC ® FC-0821-1" produced by Dainippon Ink and Chemicals, Inc.) was used in place of the adhesive ("82XE195" produced by Mobil Oil Corp.), and evaluated also in the same manner as in Example 1. The results are shown in Table 1.

EXAMPLE 3

A heat-sensitive recording material having an overcoat layer was produced in the same manner as in Example 1, except that 31 $g/m^2$ of a light weight Kraft paper was used in place of the wood free paper with a basis weight of 101 $g/m^2$, and evaluated also in the same manner as in Example 1. The results are shown in Table 1.

COMPARATIVE EXAMPLE 1

A heat-sensitive recording material was produced in the same manner as in Example 1, except that as the substrate, a wood free paper with a basis weight of 101 $g/m^2$ was used alone in place of the biaxially stretched polypropylene film/wood free paper laminate, and evaluated in the same manner as in Example 1. The results are shown in Table 1.

COMPARATIVE EXAMPLE 2

A heat-sensitive recording material having an overcoat layer was produced in the same manner as in Example 1, except that as the substrate, a 80 μm-thick biaxially stretched polypropylene film was used alone in place of the biaxially stretched polypropylene film/wood free paper laminate, and evaluated in the same manner as in Example 1. The results are shown in Table 1.

COMPARATIVE EXAMPLE 3

A heat-sensitive recording material having an overcoat layer was produced in the same manner as in Example 1, except that as the substrate, a 80 μm-thick synthetic paper ("Yupo ®" produced by Oji Yuka Co., Ltd.) was used in place of the biaxially stretched polypropylene film/wood free paper laminate, and evaluated in the same manner as in Example 1. The results are shown in Table 1.

COMPARATIVE EXAMPLE 4

A heat-sensitive recording material having an overcoat layer was produced in the same manner as in Example 1, except that an aqueous emulsion adhesive ("Movinyl ® 084E" produced by Hoechst AG) made mainly of ethylene and vinyl acetate was used in place of the electron beam-curable adhesive and coated on a 35 μm-thick biaxially stretched polypropylene film in a dry weight of 5 gm/$^2$, and the film was superposed on a wood free paper with a basis weight of 101 g/m$^2$ and laminated by passing them between nip rolls with a linear pressure of 2 kg/cm. Thereafter, the laminate was dried with hot air maintained at 80° C. The heat-sensitive recording material was evaluated in the same manner as in Example 1. The results are shown in Table 1.

As apparent from the results of Table 1, all of the heat-sensitive recording materials obtained in the above Examples have excellent image quality and image smoothness, and further are free from troubles such as jamming at the time of heat-sensitive recording. Thus they are of greatly high product value.

TABLE 1

| | Example | | | Comparative Example | | | |
|---|---|---|---|---|---|---|---|
| | 1 | 2 | 3 | 1 | 2 | 3 | 4 |
| Thickness (μm) | 170 | 170 | 80 | 135 | 80 | 80 | 170 |
| Bekk Smoothness (sec) | 4300 | 4200 | 5100 | 30 | 5800 | 3800 | 3300 |
| Surface Roughness (μm) | | | | | | | |
| Rx | 3.7 | 4.1 | 5.0 | 10.1 | 3.2 | 3.7 | 4.3 |
| Stiffness* | | | | | | | |
| MD | 192 | 190 | 42 | 180 | 23 | 21 | 188 |
| CD | 179 | 177 | 41 | 110 | 34 | 40 | 174 |
| Image Quality | ○ | ○ | ○ | X | ○ | ○ | Δ |
| Image Smoothness | ○ | ○ | ○ | ○ | X | X | ○ |

*Measured by the use of a Clark stiffness tester.

While the invention has been described in detail and with reference to specific embodiments thereof, it will be apparent to one skilled in the art that various changes and modifications can be made therein without departing from the spirit and scope thereof.

What is claimed is:

1. A substrate for heat sensitive recording material, comprising a film-like substrate comprised of a synthetic resin having a thickness of 10 to 200 μm and a sheet-like substrate comprised of a fibrous material laminated to each other with an electron beam-curable adhesive having a viscosity of 100 to 20,000 cps at 25° C., said adhesive being coated in a dry weight amount of 0.1 to 20 g/m$^2$ and having been exposed to 0.1 to 15 Mrads of radiation.

2. A substrate as claimed in claim 1, wherein said film-like substrate comprises a non-stretched or stretched film of polypropylene, polyethylene terephthalate, polystyrene, polyvinyl chloride or polyethylene.

3. A substrate as claimed in claim 1, wherein said film-like substrate comprises a porous layer having fine irregularities.

4. A substrate as claimed in claim 1, wherein said sheet-like substrate comprises pulp fiber paper, synthetic fiber paper, or pulp and synthetic fiber paper.

* * * * *

UNITED STATES PATENT AND TRADEMARK OFFICE
CERTIFICATE OF CORRECTION

PATENT NO. : 5,037,696

DATED : August 06, 1991

INVENTOR(S) : Junichi Miyake et al.

It is certified that error appears in the above-identified patent and that said Letters Patent is hereby corrected as shown below:

Title Page:

Abstract, line 4, change "materials" to --material--.

Abstract, line 4, after "laminated" insert --to--.

Claim 1, column 8, line 24, change "heat sensitive" to --heat-sensitive--.

Signed and Sealed this

Thirteenth Day of April, 1993

*Attest:*

STEPHEN G. KUNIN

*Attesting Officer*

*Acting Commissioner of Patents and Trademarks*